Patented Dec. 7, 1943

2,335,861

UNITED STATES PATENT OFFICE 2,335,861

TRICARBOCYANINE DYESTUFF AND METHOD OF PREPARATION

John David Kendall, Ilford, England, assignor to Ilford Limited, Ilford, England, a British company No Drawing. Application February 21, 1940. Serial No. 320,221. In Great Britain March 21, 1939

11 Claims. (Cl. 260—240)

This invention relates to the production of dyestuffs for sensitising photographic silver halide emulsions.

It is an object of this invention to produce a new range of tricarbocyanine dyestuffs having a sensitising action on silver halide photographic emulsions and the invention includes the process for the production of the new dyestuffs, the new dyestuffs themselves and light-sensitive silver halide photographic emulsions containing the new dyestuffs.

According to the invention, tricarbocyanine dyestuffs are produced by reacting, in the presence of a solvent and an acid binding agent, a quaternary salt of a thiazole or selenazole compound containing a reactive methyl group in the $\alpha$ position to the heterocyclic nitrogen atom with a compound obtainable by acetalising $\gamma$-pyrone with an alkyl-ortho-formate.

The product obtained by acetalising $\gamma$-pyrone is believed to be diformyl-acetone-hexa-alkyl-acetal of the formula

(compare the paper by Willstater and Rummerer, Berichte 38, 1470) and it is believed that the reaction with the thiazole or selenazole compound according to the invention proceeds in accordance with the following general equation:

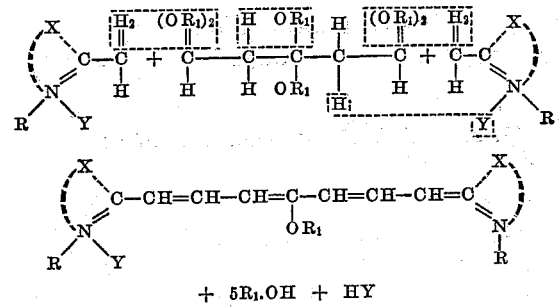

+ $5R_1.OH$ + $HY$

In the foregoing formula R represents an alkyl group, e. g. a methyl, ethyl, propyl or higher alkyl group or an aralkyl group, e. g. a benzyl group, $R_1$ represents an alkyl group, Y represents the negative radical of an acid, e. g. chloride, bromide, iodide, p-toluene-sulphonate, chlorate, sulphate and nitrate, and X constitutes the atoms necessary to complete a thiazole or selenazole nucleus.

A monocyclic thiazole or selenazole compound may be employed, but it is preferable to employ polycyclic thiazoles and selenazoles, e. g. benz- thiazole, naphthathiazole, anthrathiazole, benz-selenazole, napthaselenazole and anthraselenazole.

In the production of the $\gamma$-pyrone derivative, various alkyl orthoformates may be used, e. g. methyl, ethyl and propyl orthoformates.

In carrying out the reaction a single compound, such as pyridine, may be employed which is both a solvent and an acid binding agent, but it is preferred to employ a mixture of a solvent, such as ethyl alcohol, with an acid binding agent, such as sodium acetate. In general, the reaction proceeds quite smoothly with only gentle heating and indeed it is undesirable to heat for a prolonged period or at too high a temperature as such treatment may cause a breakdown of the reagents or of the product produced.

The new dyestuffs are valuable photographic sensitising dyestuffs for the far-red and infrared portions of the spectrum.

The following examples illustrate the invention:

Example I 1.49 gms. of 1-methylbenzthiazole and 2.00 gms. of ethyl-p-toluene sulphonate were mixed together and fused at 140–150° C. for 3½ hours. The mixture was then dissolved in 50 ccs. of pyridine and 5.8 gms. of diformyl-acetone-hexa-ethyl-acetal added to the hot solution. The mixture was then refluxed for about five minutes, during which period a strong green colour appeared. The mixture was poured into a potassium iodide solution and the solution diluted to 300 ccs. with water. A small amount of benzene was added when the dye crystallised. The dyestuff was recrystallised from methyl alcohol and considered of golden crystals, melting at 160° C. with decomposition.

The product is a valuable sensitising dyestuff. Incorporated in a silver bromide emulsion it imparts a range of sensitivity between 6700 and 8300 Å with a maximum at about 7700 Å.

Example II 0.75 gm. of 1-methylbenzthiazole and 0.95 gm. of methyl-p-toluene sulphonate were mixed together and fused at 140° C. for three hours. The product was then dissolved in 40 ccs. of absolute alcohol, and 0.28 gm. of fused sodium acetate and 3.4 gms. of diformyl-acetone-hexa-ethyl-acetal added to the hot solution. The mixture was then heated to boiling and then allowed to cool for about five minutes. During this treatment a bright blue-green colour developed. The solution was then poured into a potassium iodide solution and diluted with water to 300 ccs. On standing for a few hours, the dyestuff separated as bronze crystals. The dyestuff was removed by filtration and recrystallised from methyl alcohol. The recrystallised product melted at 160° C. with decomposition.

The product is a valuable sensitising dyestuff. Incorporated in a silver bromide emulsion it imparts a range of sensitivity between 7200 and 8150 Å with a maximum at about 7700 Å.

*Example III*

0.5 gm. of 1-methyl-5:6-benzbenzthiazole and 0.5 gm. of ethyl-p-toluene sulphonate were mixed together and fused at 140–160° C. for four-and-a-half hours. The mixture was then cooled and refluxed with 10 ccs. of pyridine. The mixture was then allowed to cool down to 100° C. and 1.77 gms. of diformyl-acetone-hexa-ethyl-acetal added. The mixture was then warmed on a water bath and after about three minutes an intense green colour developed. The mixture was then poured into a potassium iodide solution. The dyestuff crystallised out on cooling and was separated by filtration. The dyestuff was washed with warm water, ethyl alcohol and hot benzene and then recrystallised from ethyl alcohol. The product consisted of crystals which gave a bright green solution in ethyl alcohol and which melted at 207° C. with decomposition. The product is a valuable sensitizing dyestuff. Incorporated in a silver bromide emulsion it imparts a range of sensitivity between 7500 and 8400 Å with a maximum at about 8100 Å.

I claim:

1. Process for the preparation of tricarbocyanine dyestuffs which comprises condensing, in the presence of a solvent and an acid binding agent, a compound of the general formula:

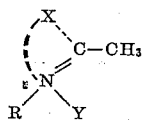

where X is the residue of a heterocyclic nucleus selected from the group consisting of the thiazole, selenazole, aryl thiazole and aryl selenazole nuclei, Y is the negative radical of an acid and R is a group selected from the group consisting of alkyl and aralkyl groups, with a compound of the general formula:

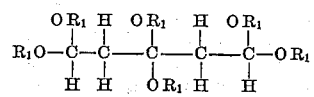

where $R_1$ is an alkyl group.

2. Process according to claim 1 wherein X constitutes the atoms necessary to complete with the nitrogen atom a benzthiazole nucleus.

3. Process according to claim 1 wherein R is a lower alkyl group.

4. Process according to claim 1 wherein $R_1$ is an ethyl group.

5. A dyestuff of the general formula:

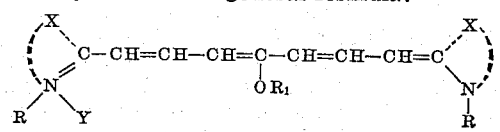

wherein X is the residue of a heterocyclic nucleus selected from the group consisting of the thiazole, selenazole, aryl thiazole and aryl selenazole nuclei, Y is the negative radical of an acid, R is a group selected from the group consisting of alkyl and aralkyl groups and $R_1$ is an alkyl group.

6. A dyestuff of the general formula:

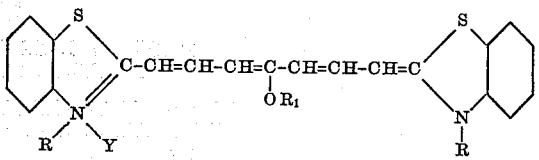

wherein Y is the negative radical of an acid, R is a group selected from the group consisting of alkyl and aralkyl groups and $R_1$ is an alkyl group.

7. A dyestuff of the general formula:

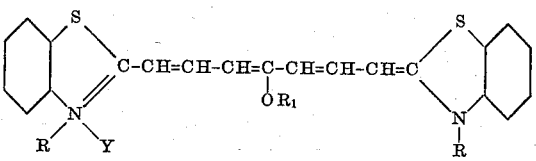

wherein Y is the negative radical of an acid, R is a lower alkyl group and $R_1$ is a lower alkyl group.

8. A dyestuff of the general formula:

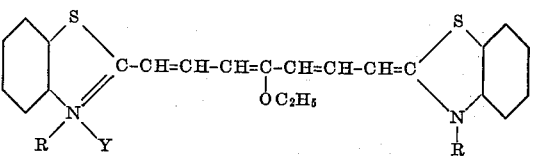

wherein Y is the negative radical of an acid and R is a lower alkyl group.

9. A dyestuff of the general formula:

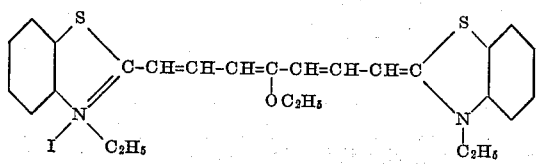

10. A dyestuff of the general formula:

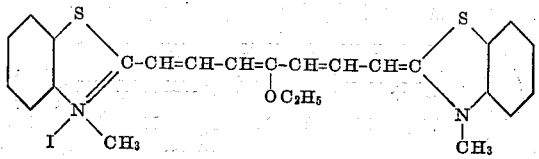

11. A dyestuff of the general formula:

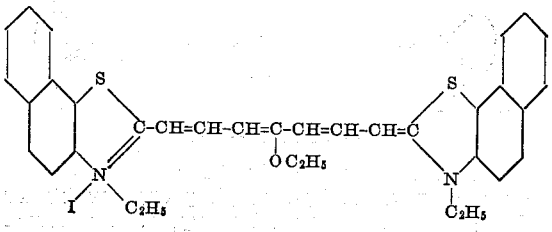

JOHN DAVID KENDALL.